Sept. 10, 1940.   H. E. PIM   2,214,346

VALVE FOR VACUUM SEALS

Filed April 17, 1939

INVENTOR.
HARVEY E. PIM
BY *Martin E Anderson*
ATTORNEY.

Patented Sept. 10, 1940

2,214,346

UNITED STATES PATENT OFFICE 2,214,346

VALVE FOR VACUUM SEALS

Harvey E. Pim, Denver, Colo., assignor to Vacuum Equipment Corporation, Denver, Colo., a corporation of Colorado Application April 17, 1939, Serial No. 268,307

1 Claim. (Cl. 251—160)

This invention relates to improvements in valves for vacuum seals and has reference more particularly to valves of the general type shown in the following United States Patents, to-wit: No. 1,773,311, August 18, 1930; No. 1,595,177, August 10, 1926; and No. 2,131,809, October 4, 1938.

Experience has demonstrated that containers can be vacuum sealed more conveniently and quickly and can be opened with greater ease if the cover is secured in place by the air pressure than when the seal is effected by means of a screw top or other means embodying a substantially rigid cover separated from the open end of the jar by a rubber gasket which is put under compression by forces produced by mechanical means.

It has been found that if a thin metal cover having a central opening is used and separated from the open end of the jar by a soft rubber gasket, and the vessel evacuated by means of an air pump, the vacuum can be maintained indefinitely if a suitable valve member is positioned over the opening so as to be forced against the outer surface of the cover by the air pressure after the pump has been removed.

In the patents above identified valves of the general type referred to have been shown in the combination described.

Since such valve members must be positioned between the pump and the cover during evacuation, they must be so constructed that they will remain properly positioned to effect a seal as soon as the suction is discontinued. Another requirement is that the valve must have a thin flexible edge resting on the cover, which will respond to very small forces and effect the primary sealing action. The valve member must also be so constructed that the primary seal will not break when the valve is deformed by the gradual or sudden application of atmospheric pressure. It is also desirable that the valve member shall be so constructed that its center can flex into sealing engagement with the surface of the cover so as to come into physical contact therewith adjacent the vent opening, and another important requirement is that the valve shall be reversible so that no care needs to be exercised in placing it on the cover.

Some of the features mentioned above are present in valves already invented, but so far as is known, no one valve member possesses all of the features pointed out.

It is the object of this invention to produce a valve that can be substituted for the corresponding element in the combinations illustrated in the patents above identified, and which will possess all of the desirable features pointed out above.

The improved valve which forms the subject of this invention is formed from rubber, either natural or artificial, or of some substance having similar characteristics. The material must be flexible, must have some resiliency and must be able to resist the action of air and temperature changes without injuring the seal. The valve is circular and its outer wall is preferably cylindrical. The opposite side surfaces are concave and spherical so as to form a lens-like article of biconcavo shape. The spherical surfaces have radii of curvature that must be greater than the radius of the valve so that they will intersect the cylindrical surface and form sharp, feather edges that will yield to slight pressures to form a primary seal. The radii of curvature of the spherical concave surfaces can be made larger than the diameter of the valve so that the latter can be made quite thin and flexible and still retain the desirable characteristics pointed out.

By making the valve symmetrical with respect to its center plane, it is reversible and can be applied in position with either side down.

In order to more clearly disclose the invention, reference will now be had to the accompanying drawing in which the invention has been illustrated, and in which.

Figure 1:
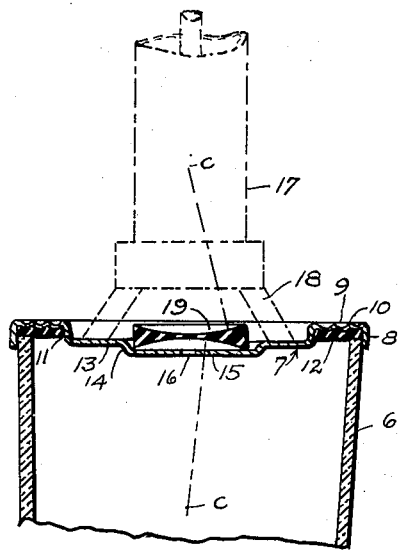
Figure 1 is a diametrical section taken on Figure 2, and shows a cover in position in a vessel and shows the valve in position, the vacuum pump being indicated by broken lines.
Figure 2:
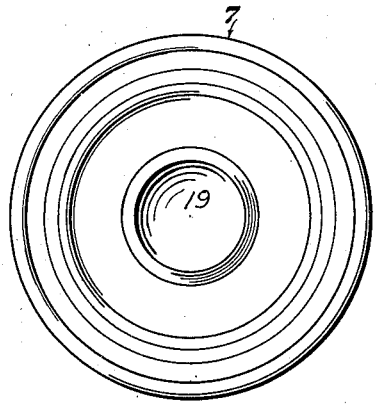
Figure 2 is a top plan view of the assembly shown in Figure 1.

In the drawing reference numeral 6 designates a glass vessel which may be a jelly glass or may represent an ordinary fruit jar or any similar vessel of the type ordinarily used for preserving fruits and food products. Resting on the top of the vessel is a sheet metal cover 7 which, in the embodiment shown, is provided along its outer edge with a downwardly turned flange 8 and which has an annular zone 9 in which the metal is circularly corrugated as indicated by reference numeral 10. The zone 9 terminates in a substantially vertical wall 11 and on the under side of the annular zone is positioned a soft rubber ring 12 that forms a gasket. The reason for having zone 9 as wide as shown in the drawing is that it will fit vessels of different diameters providing the diameters do not vary more than the width of the corrugated zone. Extending inwardly from the vertical wall 11 is a flat zone 13 that terminates in a downwardly inclined annular zone 14, which in turn connects with a circular bottom 15 that is provided with a vent hole 16. In Figure 1 a vacuum pump 17 has been indicated by broken lines and this terminates in a rubber sealing member 18 that rests on the upper surface of zone 13. When the piston is reciprocated, the pump tends to evacuate the vessel 6, causing any vapors or gases to leave through the vent 16.

In order to prevent air from returning to the vessel through the vent opening when the pump in removed, a valve member 19 is provided and this is positioned on the upper surface of the circular central portion 16.

The present invention relates to shape and construction of the sealing member and this will now be described in detail.

Figure 3:
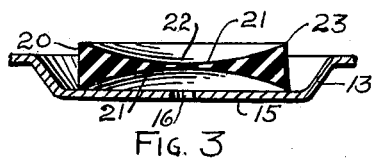
Figure 3 is a diametrical section, similar to that shown in Figure 1 and shows the parts to an enlarged scale.
Figure 4:
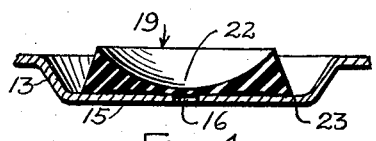
Figure 4 is a section like that shown in Figure 3 and shows the valve deformed by the action of the external pressure.
Figure 5:
Figure 5 is a diametrical section through the valve showing the same scale used in Figure 1.

In Figures 3, 4 and 5, the valve member has been shown to a scale approximately twice that used in Figure 1, so as to make the construction and operation more clearly visible.

It will be seen that the valve member, which is formed from natural or artificial rubber, or some similar flexible compound, which is also preferably elastic, is circular and its outer surface has been shown as cylindrical, although it may vary from this if any advantage should be found by so doing. The upper and lower surfaces, which have both been indicated by reference numeral 21, are spherical and concave. The centers of curvatures of these surfaces have been designated by C in Figure 1. The center portion of the valve, which has been designated by reference numeral 22, is quite thin and the valve member is made of such material and of such size as to be readily flexible when subjected to a pressure corresponding to atmospheric pressure. It will be seen, that due to the fact that the radii of the curvature are longer than the diameter of the valve, the curvatures of the spherical surfaces are such that they intersect the cylindrical surface 19 at an acute angle so as to provide a sharp incidence line 23 that rests on the upper surface of the cover in the manner shown in Figure 3. Due to the sharp angle at the point where the surfaces intersect, the edges of the valve member on both sides are quite sharp and since the material is flexible, a very small pressure will serve to form a primary seal between the cover and the valve. The longer the radii of curvature are with respect to the diameter of the valve, the thinner the valve can be made, and in Figure 5 a transverse section of a valve has been shown in which the radii of curvature are approximately twice the diameter of the valve and the latter is therefore quite thin.

Let us now assume that the vessel 6 contains some food product and that it is desired to evacuate the same so as to form an airtight container in which the food product may be preserved. The cover is first put into position, after which the valve 12 is positioned in the central depressed area. The vacuum pump is now positioned on the cover in the manner shown by broken lines in Figure 1 and when the pump is operated, it produces a suction that removes air and vapors from the interior of vessel 6 through the vent 16. Due to the lightness of the valve, these gases and vapors readily pass outwardly between the cover and the valve. When the evacuation has been carried on to the required extent, the operation of the pump is discontinued and air is permitted to enter so as to produce a pressure on the valve. As soon as the valve is subjected to even a small pressure, the sharp or thin edge that rests on the cover is forced against the latter and forms a primary seal and upon further increase of pressure on the outer surface of the valve, the latter is forced against the cover with a corresponding force, until finally it assumes the position shown in Figure 4. During this deforming action, the primary seal is not broken because the valve deforms in such a way that the incidence line or edge 23 always remains in contact with the cover. When the valve is made of sufficiently flexible material, the atmospheric pressure to which it is finally subjected bends the thin center portion 22 into actual contact with the cover above the edge of the vent opening and this supplements the sealing action of the incidence edge 23.

After the pump has been removed and the valve has been distorted to the shape shown in Figure 4, it will remain in this position indefinitely, as air cannot enter between the cover and the valve.

When the container is to be opened, the valve member is removed by means of a knife or other suitable implement, thereby permitting air to enter the vessel through the vent opening, whereupon the pressure inside and outside will equalize, thus permitting the cover to be readily removed.

Attention is called to the fact that this valve member is so constructed that it is symmetrical with respect to a plane parallel with the incidence edges 23 and positioned halfway between the center portions of the spherical concave surfaces. This shape makes it possible to apply the valve with either side in contact with the cover as distinguished from other valves of this general type in which one side is concave and the other convex for such valves must be positioned with care as it is evident that the concave side must face the cover.

Another advantage of the construction shown and described is that due to the cylindrical surfaces 20, the valve member does not readily attach itself to the adjacent inclined surfaces of the depressed area, and it will therefore always properly position itself for sealing. This is important for the reason that during the sealing operation the valve is within the chamber 18 of the vacuum pump and can neither be seen nor manipulated.

The biconcavo shape of the sealing member is believed to be of great practical importance in this art for reasons given above, and besides this, it can be constructed with less expense and with simpler dies than those that are required for many other valves of this general type.

Having described the invention what is claimed as new is:

A circular imperforate valve member of flexible rubber-like material having opposite sides formed by spherically concave surfaces whose centers of curvature lie in the axis of the valve, the radii of curvature being equal and greater than the radius of the valve member whereby the lines of intersection of the spherical surfaces and the outer wall surface of the valve are circular, the valve member being symmetrical with respect to a plane positioned midway between the centers of curvature and perpendicular to a line joining them.

HARVEY E. PIM.